US006530556B1

(12) United States Patent
Boecking

(10) Patent No.: US 6,530,556 B1
(45) Date of Patent: Mar. 11, 2003

(54) CONTROL UNIT FOR CONTROLLING A PRESSURE BUILD-UP IN A PUMP UNIT

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,655

(22) PCT Filed: Aug. 18, 1999

(86) PCT No.: PCT/DE99/02553

§ 371 (c)(1), (2), (4) Date: Jun. 5, 2000

(87) PCT Pub. No.: WO00/11340

PCT Pub. Date: Mar. 2, 2000

(30) Foreign Application Priority Data

Aug. 18, 1998 (DE) .......................................... 198 37 333

(51) Int. Cl.[7] .......................................... F16K 31/02

(52) U.S. Cl. .......................................... 251/129.07; 251/282

(58) Field of Search .......................................... 251/129.07, 282, 251/129.06

(56) References Cited

U.S. PATENT DOCUMENTS 4,550,744 A * 11/1985 Igashira et al. ............. 251/282
4,619,239 A * 10/1986 Wallenfang et al. ........ 123/506
4,653,723 A * 3/1987 Rizk et al. .................. 251/282
4,832,312 A * 5/1989 Linder et al. .......... 251/129.07
5,370,095 A * 12/1994 Yamaguchi et al. ........ 123/446
5,497,806 A * 3/1996 Swank et al. .......... 251/129.07
5,606,953 A * 3/1997 Drummer et al. ........... 123/506
5,641,148 A * 6/1997 Pena et al. ............. 251/129.07
6,068,236 A * 5/2000 Espey .................. 251/129.07

* cited by examiner

*Primary Examiner*—John Fox
(74) *Attorney, Agent, or Firm*—Ronald E. Greigg

(57) ABSTRACT

The invention relates to a control unit (4) for controlling the pressure buildup in a pump unit (2), with a control valve (5) and a valve actuation unit (6) connected to it, wherein the control valve (5) is embodied as an I-valve that opens inward in the flow direction, which has a valve body (11) that is supported so that it can move axially in a housing (12) of the control unit (4) and rests against a valve seat (13) of the control valve (5) from the inside when the control valve (5) is closed. In order to produce a control unit (4) whose control valve (5) requires lower valve actuation forces and has short switching times, the invention proposes a control unit (4) which is characterized by means of an axially effective surface of the valve body (11) which surface is embodied in such a way that the forces, which act on the valve body (11) when the control valve (5) is closed and are due to the pressure present in the pump unit (2), cancel each other out.

5 Claims, 2 Drawing Sheets

CONTROL UNIT FOR CONTROLLING A PRESSURE BUILD-UP IN A PUMP UNIT

The invention relates to a control unit for controlling a pressure buildup in a pump unit, with a control valve and a valve actuation unit connected to the pump unit. The control valve is embodied as an inlet-valve that opens in the inlet flow direction, which has a valve body which is supported so that the valve body can move axially in a housing of the control unit and rests against a valve seat of the control valve from the inside when the control valve is closed.

PRIOR ART

Control units of this kind can be used to control a pressure buildup in a wide variety of pump units. For example, the prior art has disclosed control units which control the pressure buildup of pump units that are used to build up an injection pressure of an injection system for fuel delivery into a combustion chamber of direct injection internal combustion engines. Control units of this kind are usually embodied as solenoid valves. In this connection, the valve actuation unit is embodied as an electromagnet which actuates the control valve. The solenoid valve is open when it is not excited. As a result, there is a free through flow from the pump unit to the low-pressure region of the injection system and it is consequently possible for the pump chamber to be filled with fuel during the intake stroke of the pump piston and a return flow of the fuel during the delivery stroke. A triggering of the solenoid valve during the delivery stroke of the pump piston closes this bypass. This leads to a pressure increase in the high-pressure region of the system.

In the control units known from the prior art, the control valve is usually embodied as a so-called inlet valve that opens in the inlet flow direction. In comparison to so-called outlet-valves that open out in the flow direction, inlet-valves have the advantage that they are significantly easier and less expensive to produce.

However, the known control units have the disadvantage that a considerable expenditure of force is required to actuate the control valve by the valve actuation unit. This is a result of the fact that when the control valve is closed, highly pressurized mediums exert compressive forces on the valve body and the resulting force in the axial direction must be overcome when the control valve is actuated. According to the prior art, spring elements, which counteract the resulting force acting on the valve body, are frequently used in order to reduce the valve actuation forces. However, these spring elements exert a constant spring force on the valve body independent of the pressure prevailing in the control valve. At low pressures, this spring force can be too high, at higher pressures, the spring force can be too low, so that in both instances, a considerable expenditure of force is required in order to overcome the spring force or in order to overcome the resulting force acting on the valve body.

For this reason, the valve actuation units according to the prior art must be selected so that they always exert a sufficiently high force to actuate the control valves. As a rule, this usually requires bulky valve actuation units. In the control valves of the control units according to the prior art, the use of piezoelectric actuators as valve actuation units is not possible since the valve actuation forces or valve actuation strokes produced by the piezoelectric actuators are as a rule not of sufficient magnitude to actuate the known control valves.

Another disadvantage of the known control units lies in the switching times which are quite long due to the high valve actuation forces.

The above-mentioned disadvantages of the prior art give rise to an object of the invention, which is to produce a control unit whose control valve can be actuated with low valve actuation forces and which has short switching times.

In order to attain this object, a control unit of the type mentioned at the beginning which is characterized by an axially effective surface of the valve body which is embodied in such a way that the forces, which act on the valve body when the control valve is closed and are due to the pressure present in the pump unit cancel each other out.

In the control unit according to the invention, the compressive forces of the medium present in the control valve are advantageously used to reduce the valve actuation forces to a minimum as a function of the pressure of the medium present. The compressive forces acting on the valve body cancel each other out so that the resulting force is equal to zero. To this end, the axially effective surface of the valve body that is directed inward in the flow direction and the axially effective surface of the valve body that is directed outward in the flow direction have the same area. Due to the medium present against the valve body, equal, but counterpoised compressive forces act on the two axially effective surfaces and cancel each other out. Consequently, only forces other than the force resulting from the compressive forces have to be overcome in the actuation of the control valve, e.g. friction forces or spring forces. The axially effective surface of the valve body can also be embodied in such a way that the resulting force counteracts the other forces so that when all of the forces acting on the valve body are added together, the result is minimal valve actuation forces.

As a result of the low valve actuation forces, the control unit according to the invention advantageously has very short switching times. The switching times are approximately $100 \cdot 10^{-6}$ seconds.

The cross-section through the valve body and the course of the valve seat can have an arbitrary contour. In actual use, round shapes such as circles or ellipses predominate, among other things, for technical manufacturing reasons. However, it is also conceivable for use of other contours which do not have a round course.

According to an advantageous improvement of the invention, the valve body has a circular cross-section and is supported so that the valve body can move axially in the housing by means of a first guide element that is disposed on the inside in the flow direction, that the valve seat has an annular course, and that the outer diameter of the first guide element is equal to the outer diameter of the valve seat. In this improvement, a first annular axially effective surface is embodied so that the surface is disposed in the inlet flow direction and is directed inward around the first guide element. A second annular axially effective surface of the same size is embodied so that the second surface is likewise disposed in the inlet flow direction and is directed outward toward the out-flow. The pressure of the medium against the valve body when the control valve is closed produces equivalent compressive forces against the two annular surfaces. The compressive forces are counterpoised and cancel each other out. The valve actuation forces are consequently minimal if there is any pressure against the valve body.

In order to assure a reliable guidance of the valve body in the housing of the control unit, the valve body is supported so that the valve body can move axially in the housing by use of a second guide element that is disposed on the outside in the flow direction. In this way, the valve body is supported so that the valve body can move axially in the housing by means of a guide element on both sides of the valve seat. As a result, a full contact of the valve body against the valve seat and a reliable sealing function of the valve seat can be assured.

In order to prevent an excessively abrupt return of the valve body when the control valve opens, the second guide element has an axially effective surface that is embodied in such a way that the forces which act on the valve body due to the prevailing pressure when the control valve is open virtually cancel each other out. When the control valve is open, the axially effective surface of the valve body that is directed in the out flow direction is enlarged by an area which, when the control valve is closed, is protected by the valve seat from the pressure acting on the valve body. When the control valve is opened, the prevailing pressure produces a force that is directed in the inlet flow direction and acts on the valve body. The second guide element has an axially effective surface, which is directed in the inlet flow direction and extends around the valve body. The surface is acted on by the prevailing pressure when the control valve is open and produces an outwardly directed force that acts on the valve body. Independent of the magnitude of the prevailing pressure, the two forces virtually cancel each other out. As a result, with an arbitrarily high pressure, a controlled return of the valve body can always be assured.

Preferably, a spring element is disposed between the valve body and the housing and presses the valve body away from the valve seat into an open position when the valve actuation unit is not activated. When the valve actuation unit is not activated, the control valve is consequently open, i.e. the medium to be pumped by the pump unit can flow freely from the pump unit to the low pressure region of the system and back again. In the open position of the control valve, it is consequently possible for there to be a filling of the pump chamber with the medium to be pumped during the intake stroke of the pump piston and a return flow of the medium during the delivery stroke.

According to an advantageous improvement of the invention, the valve actuation unit is embodied as a piezoelectric actuator. The advantages of the control unit according to the invention particularly come into play when the control valve is triggered by a piezoelectric actuator. Since no valve actuation forces or extremely slight forces have to be exerted in order to actuate the control valve in the control unit according to the invention, the maximal stroke of a piezoelectric actuator can be used. This is particularly true because when the control valve is closed, only extremely small force reserves of the valve actuation unit are required in order to keep the control valve in the closed position.

In order to facilitate the assembly of the control unit, the housing is constructed of two parts, the first housing part has a first axial bore for containing the first guide element and a coaxial second bore with a larger diameter into which the inlet of the pump unit feeds, and the valve seat is embodied on the end face of the second housing part disposed on the inlet flow direction, and the second housing part is disposed in the second bore spaced apart from a bottom of the housing.

By means of the at least two-part design, the valve body can be disposed between the individual housing parts and positioned in relation to them easily and inexpensively. By assembling the individual housing parts into the finished housing, the valve body can be easily disposed in a definite position inside the housing.

By letting two coaxial bores into the first housing part of the control unit, the offset of the valve body in relation to the housing can be reduced. The first and second bores can be drilled into the first housing part in one work cycle, i.e. without the drill having to be removed after the first bore and repositioned before the second bore. Consequently, the axial offset between the first and second bore is reduced to a minimum. The second housing part is advantageously press-fitted or shrink-fitted into the second bore.

The second housing part is advantageously embodied as a bushing, which has a third bore for containing the second guide element.

In order to minimize the axial offset between the third bore and the first or second bore, according to another advantageous improvement, a small amount of play is embodied between the first guide element and the first bore and a larger amount of play is embodied between the second guide element and the third bore. This is easily possible since there is only a low discharge pressure between the second guide element and the third bore. In the high-pressure region of the control unit, the small amount of play between the first guide element and the first bore provides for a sufficient seal.

The play between the first guide element and the first bore is preferably approximately 2 to $4 \cdot 10^{-6}$ m and the play between the second guide element and the third bore is preferably approximately 8 to $10 \cdot 10^{-6}$ m.

The current invention also relates to an injection system for fuel delivery into a combustion chamber of a direct injection internal combustion engine, with a pump unit for building up an injection pressure and then for injection of the fuel into the combustion chamber by means of a fuel injector.

In order to improve an injection system of this kind in such a way that the injection system has particularly short reaction times so that a particularly precise control of the fuel injection is possible, based on an injection system of the above-mentioned type, the injection system has a control unit of the type mentioned above. An injection system of this kind can be embodied, for example, as a unit injector system (UIS) or as a unit pump system (UPS).

The current invention also relates to a process for producing a control unit of the type mentioned above.

In order to minimize the axial offset in the manufacture of control units,

- a valve body is embodied with the first guide element disposed on the inlet flow direction and the second guide element is disposed on the out flow direction,
- a first bore for containing the first guide element and a coaxial second bore with a larger diameter are formed into a first housing part,
- a third bore for containing the second guide element is formed into a second housing part,
- a valve seat is embodied on an end face of the second housing part directed in the inlet flow direction,
- the valve body with the first guide element is fitted into the first bore and
- the second housing part is fitted into the second bore and fastened there in such a way that the second guide element is fitted into the third bore.

The first and second bores are formed into the housing in one work cycle, i.e. without the drill having to be removed after the first bore and repositioned before the second bore. Consequently, the axial offset between the first and second bore is reduced to a minimum. The second housing part with the third bore must merely be positioned in relation to the first two bores in such a way that the axial offset is as low as possible.

To that end, a play of approximately 2 to $4 \cdot 10^{-6}$ m is advantageously provided between the first guide element and the first bore and a play of approximately 8 to $10 \cdot 10^{-6}$ m is advantageously provided between the second guide element and the third bore.

A preferred embodiment of the invention will be explained in detail below in conjunction with the drawings.

DETAILED DESCRIPTION

Figure 1:
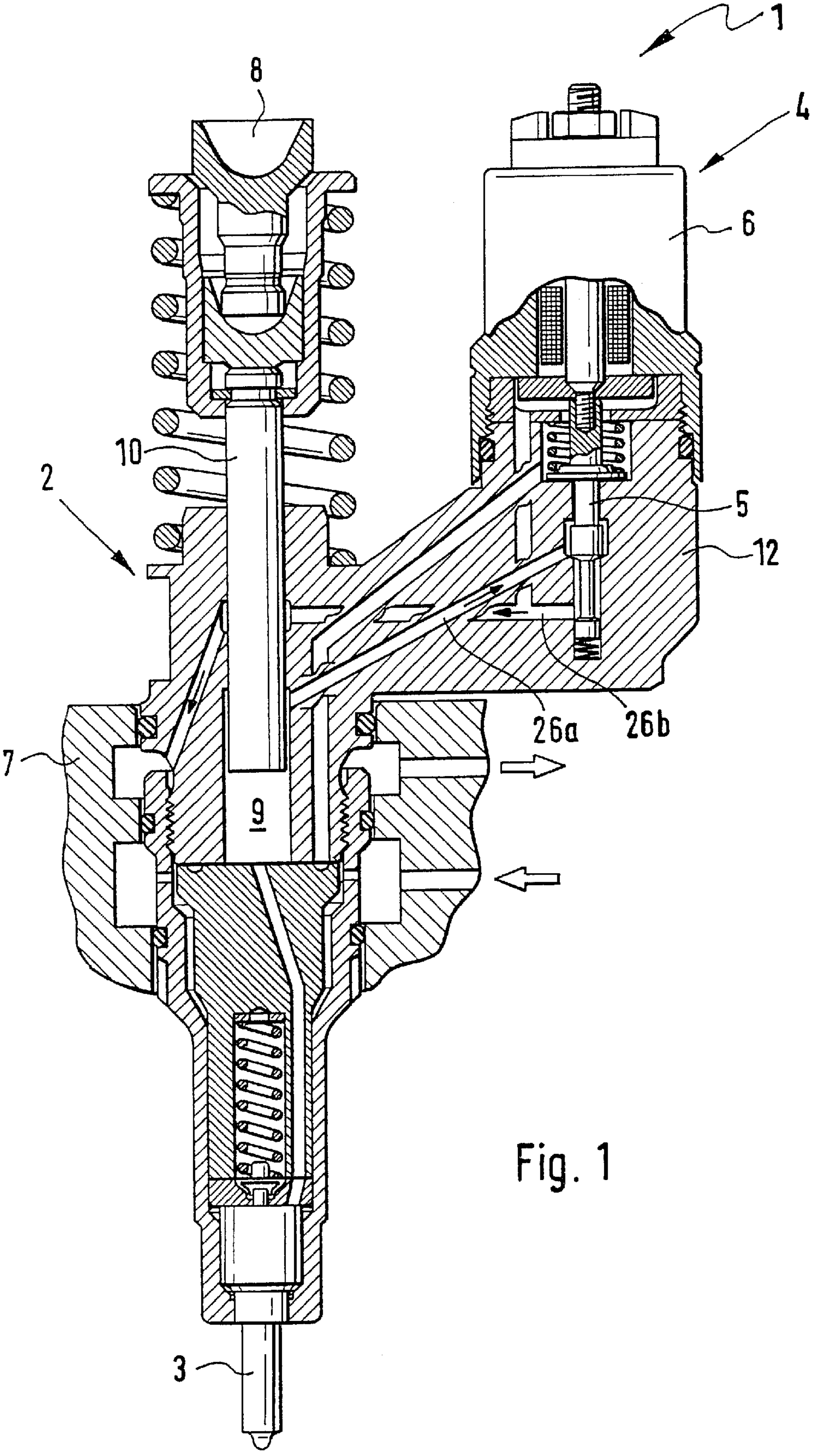
FIG. 1 shows an injection system according to the invention.

In FIG. 1, an injection system is labeled as a whole with the reference numeral 1. The injection system 1 is used for fuel delivery into a combustion chamber of direct injection internal combustion engines. It has a pump unit 2 for building up an injection pressure and for injecting the fuel into the combustion chamber via a fuel injector 3. The injection system 1 also has a control unit 4, with a schematically depicted control valve 5 and a valve actuation unit 6 for controlling the pressure buildup in the pump unit 2.

The injection system 1 is embodied as a unit injector system (UIS). In the UIS, the pump unit 2 and the fuel injector 3 constitute a unit. A UIS 1 is built into the cylinder head 7 of the internal combustion engine for each engine cylinder and is driven either directly via a tappet or indirectly via a rocker arm by an engine camshaft (not shown) by way of an actuation mechanism 8.

A pump chamber 9 of the pump unit 2 is connected to the control valve 5 of the control unit 4 by bypass bores 26. The control valve 5 is open when the electric control unit 4 is not excited. As a result, there is a free through flow from the pump unit 2 to the low-pressure region of the system and consequently it is possible for there to be a filling of the pump chamber 9 during the intake stroke of a pump piston 10 that can move axially in the pump chamber 9 and a return flow of the fuel during the delivery stroke (see the arrows in the bypass bores 26 (inlet) and 26*b* (outlet)).

A triggering of the control unit 4 during the delivery stroke of the pump piston 10 closes this bypass. This leads to a pressure buildup in the high-pressure region and after the opening pressure of the fuel injector 3 is exceeded, leads to the injection of fuel into the combustion chamber of the internal combustion engine. The closing point of the control unit 4 consequently determines the injection onset and the closing duration of the control unit 4 determines the injection quantity.

In the injection system 1 shown in FIG. 1, the valve actuation unit 6 of the control unit 4 is embodied as a piezoelectric actuator. The control valve 5 is embodied as an inlet valve that opens inward, which has a valve body 11 that acts on a valve seat 13 in the flow direction and closes the control valve 5.

Figure 2:
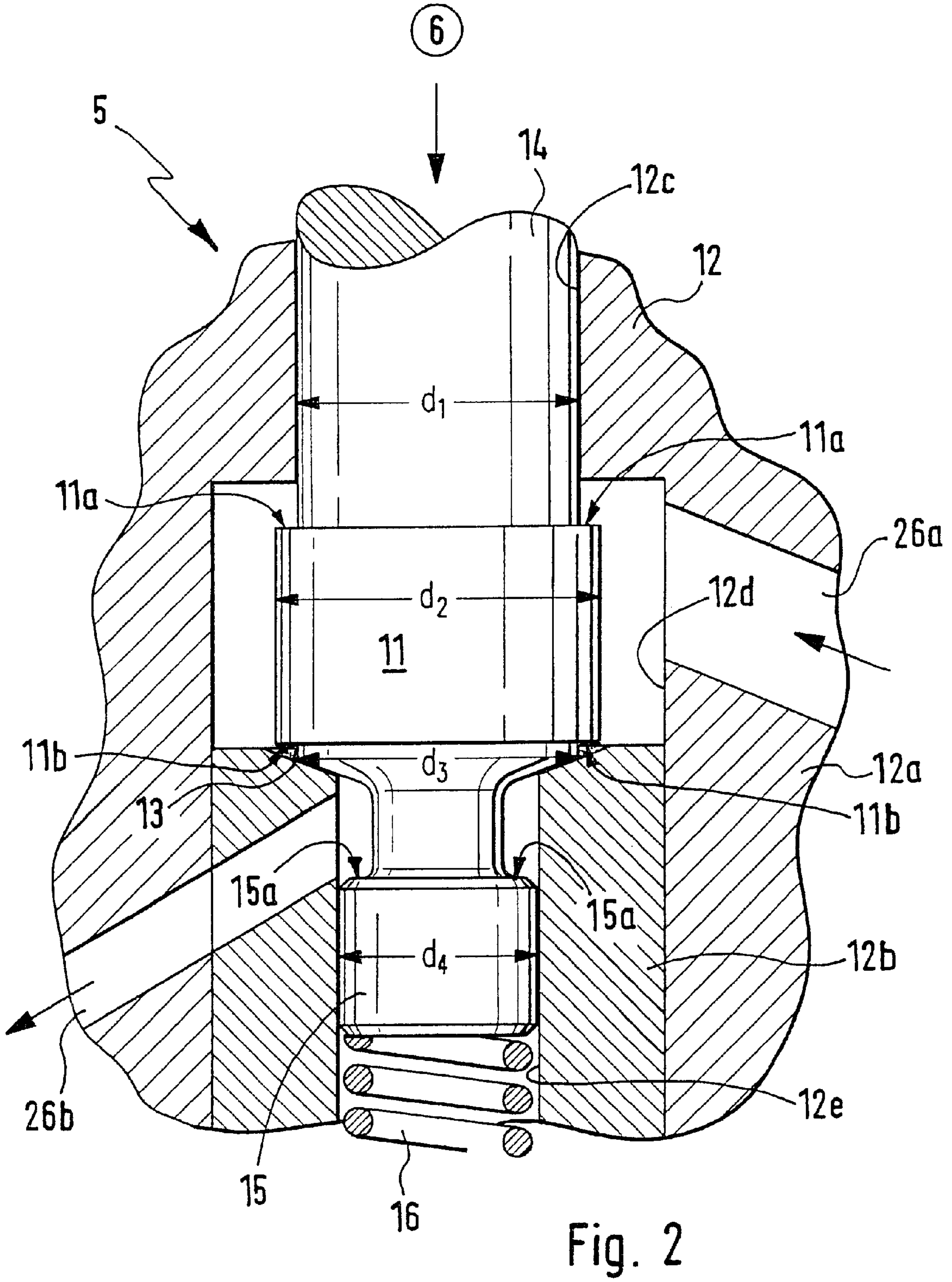
FIG. 2 shows a control unit according to the invention in greater detail.

The control valve 5 will be explained in detail in FIG. 2 in conjunction with an exemplary embodiment. Corresponding reference numerals are used for the same components in FIG. 2.

The control valve 5 is connected to the valve actuation unit 6 from above in the drawing, i.e. on the inside in the flow direction. The control valve 5 has a valve body 11 that is supported so that the valve body can move axially in a housing 12 of the control unit 4. When the control valve 5 is closed, the valve body 11 rests against the valve seat 13 from the inside in the flow direction. The valve body 11 has a circular cross-section and a first guide element 14 that is supported so that the guide element can move axially in the housing 12. The valve seat 13 has an arc-shaped course. The diameter $d_1$ of the first guide element 14 is equal to the diameter $d_3$ of the valve seat 13. This produces two equal-sized surfaces 11*a* and 11*b* of the valve body (11), which are axially effective in opposite directions. When the control valve 5 is closed, a pressure of the pump unit 2 rests against the valve body via the bypass bore 26*a*. The pressure acts in the axial direction on the two annular axially effective surfaces 11*a* and 11*b* and produces two equivalent counterpoised forces that act on the valve body in the axial direction and cancel each other out. The valve actuation forces are consequently minimal.

The valve body 11 also has a second guide element 15, which is supported so that the second guide element can move axially in the housing 12 and is disposed on out flow direction, with an axially effective surface 15*a* that is directed inward. The surface 15*a* prevents an abrupt return of the valve body 11 when the control valve 5 opens.

When the control valve 5 is open, the axially effective surface of the valve body 11 directed outward in the flow direction is enlarged by an area which, when the control valve 5 is closed, is protected by the valve seat 13 from the pressure acting on the valve body 11. When the control valve 5 is opened, the prevailing pressure produces a force that is directed inward in the flow direction and acts on the valve body 11. The second guide element 15 has an axially effective surface 15*a,* which is directed in the inlet flow direction and extends around the valve body 11, which surface is acted on by the prevailing pressure when the control valve 5 is open and produces an outwardly directed force that acts on the valve body 11. Independent of the magnitude of the prevailing pressure, the two forces virtually cancel each other out.

The valve body 11 includes an enlarged diameter portion having a diameter $d_2$ which is larger in diameter than the diameter $d_1$ of the first guide element 14. The two annular axially effective surfaces 11*a* and 11*b* are formed on the enlarged diameter portion of valve body 11. The enlarged diameter portion of valve body 11 is movable within the second bore 12*d* in a space defined by the bottom of the second bore and the valve seat on the end face of the second housing part.

In order to simplify the manufacture of the control unit 4, the housing 12 is constructed of two parts. The first housing part 12*a* has a first axial bore 12*c* for containing the first guide element 14 and a coaxial second bore 12*d* with a larger diameter into which the inlet (bypass bore 26*a*) of the pump unit feeds. The second housing part 12*b* is embodied as a bushing which has a third bore 12*e* formed in the second housing part for containing the second guide element 15. The valve seat 13 is embodied on the end face of the second housing part 12*b* disposed on the inside in the flow direction. The second housing part 12*b* is disposed in this second bore 12*d,* spaced apart from a bottom of the second housing part. The second housing part 12*b* is press-fitted or shrink-fitted into the second bore 12*d.*

A play of approximately 2 to $4 \cdot 10^{-6}$ m is embodied between the first guide element 14 and the first bore 12*c* and a play of approximately 8 to $10 \cdot 10^{-6}$ m is embodied between the second guide element 15 and the third bore 12*e.* By means of the small amount of play between the first guide element 14 and the first bore 12*c* and the larger amount of play between the second guide element 15 and the third bore 12*e,* an axial offset of the valve body 11 in the housing 12 is kept as small as possible.

When the valve actuation unit 6 is inactive, the valve body 11 is pressed in the inlet flow direction away from the valve seat 13, into an open position by a spring element 16 embodied as a compression spring. The spring element is disposed between the housing 12 and the valve body 11. By activating the valve actuation unit 6, the valve body 11 is pressed into a closed position against the valve seat 13.

The foregoing relates to a preferred exemplary embodiments of the invention, it being understood that other variants and embodiments thereof are possible within the spirit and scope of the invention, the latter being defined by the appended claims.

I claim:

1. A control unit (4) for controlling a pressure buildup in a pump unit (2) of a fuel delivery system, the pump unit (2) comprising a control valve (5) and a valve actuation unit (6) connected to the control valve (5), the control valve (5) has an inlet (26*a*) and an outlet (26*b*) wherein fuel flows through the control valve (5) in a direction from the inlet (26*a*) to the outlet (26*b*) when the control valve (5) is open, the control valve (5) has a valve body (11) that is supported so that the valve body (11) moves axially in a housing (12) of the control unit (4) and rests against a valve seat (13) of the control valve (5) when the control valve (5) is closed, the control valve (5) opens by movement of the valve body (11) in a direction opposite to the direction of fuel flow through the control valve (5), wherein axially effective surfaces (11*a,* 11*b*) of the valve body (11) are embodied in such a way that, when the control valve (5) is closed, applied forces, which act on the axially effective surfaces (11*a,* 11*b*) of the valve body (11) due to pressure present in the pump unit (2) cancel each other out, the valve body (11) has a circular cross-section and on one side has a first guide element (14) which is supported so that the valve body (11) can move axially in the housing (12), the valve seat (13) has an annular course, and an outer diameter of the first guide element (14) is equal to an outer diameter of the valve seat (13), the valve body (11) on a second side has a second guide element (15) which is supported so that the valve body (11) can move axially in the housing (12), wherein the valve actuation unit (6) is a piezoelectric actuator, the housing (12) is constructed of a first housing part (12*a*) and a second housing part (12*b*), the first housing part (12*a*) having a first axial bore (12*c*) for receiving the first guide element (14) and a second bore (12*d*) which is coaxial to the first axial bore (12*c*), has a larger diameter, and is positioned with respect to the first bore (12*c*) generally in the direction of fuel flow through the control valve (5), wherein the inlet (26*a*) leads into the second bore (12*d*), the second housing part (12*b*) is disposed in the second bore (12*d*) with an end face of the second housing part (12*b*) spaced apart from a bottom of the second bore (12*d*), and the valve seat (13) is embodied on said end face of the second housing part (12*b*), the two axially effective surfaces (11*a,* 11*b*) are formed on an enlarged diameter portion of valve body (11), said enlarged diameter portion having a diameter ($d_2$) which is greater than the diameter ($d_1$) of the first guide element (14), and said enlarged diameter portion being movable within the second bore (12*d*) in a space defined by the bottom of the second bore and the valve seat (13) on the end face of the second housing part.

2. A control unit (4) to claim 1, in which the second housing part (12*b*) is press-fitted or shrink-fitted into the second bore (12*d*).

3. A control unit (4) according to claim 1, in which the second housing part (12*b*) is embodied as a bushing, which has a third bore (12*e*) for receiving the second guide element (15).

4. A control unit (4) according to claim 1, in which a small amount of play is embodied between the first guide element (14) and the first bore (12*c*) and a larger amount of play is embodied between the second guide element (15) and the third bore (12*e*).

5. A control unit (4) according to claim 4, in which a play of approximately 2 to $4\times10^{-6}$ m is embodied between the first guide element (14) and the first bore (12*c*) and a play of approximately 8 to $10\times10^{-6}$ m is embodied between the second guide element (15) and the third bore (12*e*).

* * * * *